(12) United States Patent
Zhao

(10) Patent No.: US 8,677,143 B2
(45) Date of Patent: Mar. 18, 2014

(54) PLAYING METHOD AND DEVICE OF DIGITAL RIGHT MANAGING MULTIMEDIA

(75) Inventor: Xinzhong Zhao, Zhuhai (CN)

(73) Assignee: Actions Semiconductor Co., Ltd., Zhuhai (CN)

( * ) Notice: Subject to any disclaimer, the term of this patent is extended or adjusted under 35 U.S.C. 154(b) by 1011 days.

(21) Appl. No.: 12/374,521

(22) PCT Filed: Jan. 14, 2008

(86) PCT No.: PCT/CN2008/070099
§ 371 (c)(1),
(2), (4) Date: Jan. 21, 2009

(87) PCT Pub. No.: WO2008/086755
PCT Pub. Date: Jul. 24, 2008

(65) Prior Publication Data
US 2009/0316888 A1    Dec. 24, 2009

(30) Foreign Application Priority Data
Jan. 12, 2007  (CN) .......................... 2007 1 0026343

(51) Int. Cl.
G06F 11/30 (2006.01)
G06F 12/14 (2006.01)

(52) U.S. Cl.
USPC ............................................. 713/189; 726/4

(58) Field of Classification Search
USPC ........ 380/44; 386/344; 705/57; 713/173, 189
See application file for complete search history.

(56) References Cited

U.S. PATENT DOCUMENTS

| 7,206,496 | B2* | 4/2007 | Morohoshi et al. | ............ 386/344 |
| 2004/0133794 | A1* | 7/2004 | Kocher et al. | ................. 713/193 |
| 2004/0174996 | A1* | 9/2004 | Tewfik et al. | .................... 380/44 |
| 2007/0198424 | A1* | 8/2007 | Yamamoto et al. | ............. 705/57 |

FOREIGN PATENT DOCUMENTS

| CN | 1801929 A | 7/2006 |
| CN | 101022028 A | 8/2007 |
| JP | 2001-209396 A | 8/2001 |

OTHER PUBLICATIONS

Kun-Won Jang†; A Study on DRM System for On/Off Line Key Authentication; Feb. 2006; IJCSNS International Journal of Computer Science and Network Security; pp. 1-6.*
International Search Report of PCT/CN2008/070099, dated Apr. 30, 2008.

* cited by examiner

*Primary Examiner* — Mohammad W Reza
*Assistant Examiner* — Monjour Rahim
(74) *Attorney, Agent, or Firm* — Hamre, Schumann, Mueller & Larson, P.C.

(57) ABSTRACT

A playing method of digital right managing multimedia is disclosed, in which the files of DRM multimedia to be played take a Page as a playing basic unit, when the operation of fast-forward/fast-reverse is triggered, the method comprises: determining time of fast-forward/fast-reverse; determining number of Pages of fast-forward/fast-reverse based on the time of fast-forward/fast-reverse; determining Page of target playing position based on the number of Pages of fast-forward/fast-reverse; calculating key stream of the Page of the target playing position based on prestored key data of the first Page; decrypting ciphertext of the Page of the target playing position based on the calculated key stream of the Page of the target playing position; and decoding the decrypted Page of the target playing position and playing the decrypted Page of the target playing position. A playing device is also provided.

13 Claims, 4 Drawing Sheets

PLAYING METHOD AND DEVICE OF DIGITAL RIGHT MANAGING MULTIMEDIA

FIELD OF THE INVENTION

The present invention relates to the field of multimedia playing, and more particularly to a playing method and a playing device of digital right managing (DRM) multimedia.

BACKGROUND OF THE INVENTION

With the high-speed development of digital technology, the digital multimedia has already been used in a wide range of fields. At present, prevalent multimedia data formats include Windows Media Audio (WMA), Windows Media Video (WMV), RealMedia (RM), MP3 and OGG etc. In order to protect their intellectual property rights (especially copyrights) represented by digital information, a multimedia managing mode named digital right managing is put forward, in which the multimedia digital information needs to be encrypted and must be decrypted before it can be played normally. Therefore, it is necessary to get the key stream relevant to the digital right managing multimedia before playing the multimedia digital information. Then, it is played through the player which is able to play the digital right managing multimedia.

In the course of decoding of the digital right managing multimedia, the files can be read in the form of basic unit according to the type of file systems. The basic unit may be Page with a length of 512 bytes, 1024 bytes or 2048 bytes etc. By the same token, the length of key "k" may be 16 bytes or 32 bytes etc. Take the sequential cipher (stream cipher) algorithm of symmetric cipher for example, generally key "k" is used to get a stochastic key stream $k(i)$ ($i=0, 1, 2, \ldots, n$, n is the filelength of plaintext or ciphertext) by continuous algorithm when the digital right managing multimedia is played. Then, the key stream is used to encrypt the plaintext or decrypt the ciphertext. The above-mentioned plaintext refers to the content before encryption, while the ciphertext means the content after encryption. Furthermore, the application of ciphertext includes the content of digital right managing multimedia.

The digital right managing multimedia mechanism has well protected the intellectual property rights of copyright owner, but it also has some weak points in the course of playing the multimedia. The user needs to carry out decryption and get the original multimedia content before triggering the operation of fast-forward or fast-reverse (the number of fast-forward or fast-reverse may be the positive integer times of the number of Page). Therefore, in the course of fast-forward or fast-reverse, it is necessary to obtain the key relevant to each Page, so as to acquire a continuous key stream. Only when each key in the key stream is executed to decrypt each related Page of file, can the position of fast-forward or fast-reverse be acquired, and can the operation of fast-forward or fast-reverse be completed. The process of fast-forward or fast-reverse in itself will result in a great deal of operations (especially in the course of large fast-forward or fast-reverse), which would greatly lengthen the response time of media player as well as the course of fast-forward or fast-reverse, and lead to a waste of power supply for media player (especially the portable player whose battery has a short service life). By the same token, the waiting time is too long to the users. In reality, the user often makes use of the operation of fast-forward or fast-reverse when playing the media. The processing speed of processor or decoding chip in portable player is quite limited, so the operation of fast-forward or fast-reverse will give a great effect on the performance of portable player.

SUMMARY OF THE INVENTION

A playing method of digital right managing multimedia according to an embodiment of the present invention is provided, wherein the files of DRM multimedia to be played take a Page as a playing basic unit, when the operation of fast-forward or fast-reverse is triggered, the method includes:
    determining time of fast-forward/fast-reverse;
    determining number of Pages of fast-forward/fast-reverse based on the time of fast-forward/fast-reverse;
    determining Page of target playing position based on the number of Pages of fast-forward/fast-reverse;
    calculating key stream of the Page of the target playing position based on prestored key data of the first Page;
    decrypting ciphertext of the Page of the target playing position based on the calculated key stream of the Page of the target playing position; and
    decoding the decrypted Page of the target playing position, and playing the decrypted Page of the target playing position.

An embodiment of the present invention also provides a playing device of digital right managing (DRM) multimedia, the playing device includes:
    a decrypting device, for determining time of fast-forward/fast-reverse, determining number of Pages of fast-forward/fast-reverse based on the time of fast-forward/fast-reverse, determining Page of target playing position based on the number of Pages of fast-forward/fast-reverse, calculating key stream of the Page of the target playing position based on prestored key data of the first Page, and decrypting ciphertext of the Page of the target playing position based on the calculated key stream of the Page of the target playing position; and
    a decoding device, for decoding the Page of the target playing position decrypted by the decrypting device and playing the decrypted Page of the target playing position.

The playing method and the playing device of digital right managing multimedia provided by the embodiments of the present invention are able to directly calculate the stochastic key stream $k(i)$ of the Page relevant to the target position according to the request of fast-forward/fast-reverse of user without having to continuously calculate the stochastic key stream $k(i)$ of multiple Pages relevant to the operation of fast-forward/fast-reverse, which can realize a high-efficiency operation of fast-forward/fast-reverse, therefore, the operation of fast-forward/fast-reverse is very quick and high-efficient, and thus reducing the waiting time of user to a great extent, and improving the power utilization rate of media player.

The detailed content will become more apparent from the following detailed description of the embodiments.

The present invention will be further described in detail when taken in conjunction with the embodiments and the appended drawings as follows.

DETAILED DESCRIPTION OF THE EMBODIMENTS

Figure 1:
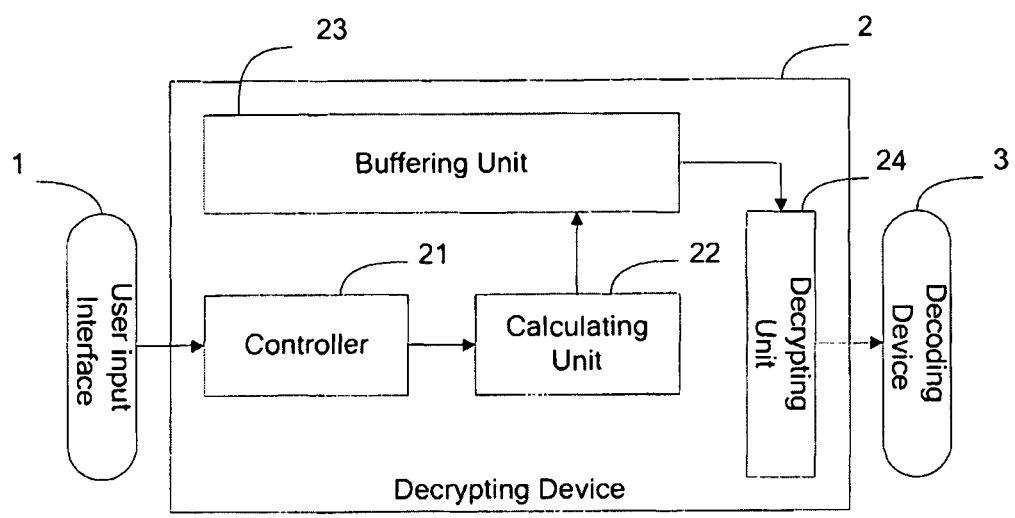
FIG. 1 is a structural schematic illustration of constituent of a playing device of a digital right managing multimedia in accordance with an embodiment of the present invention.

Referring to FIG. 1, FIG. 1 shows a structural schematic illustration of a playing device of digital right managing multimedia in accordance with an embodiment of the present invention. The playing device includes: a user input interface 1, a decrypting device 2 and a decoding device 3. Among them, the decrypting device 2 includes: a controller 21, a calculating unit 22, a buffering unit 23 and a decrypting unit 24. The signal connection and operational principle between all parts will be explained below in detail with reference to the work flow shown in FIG. 2.

Figure 2:
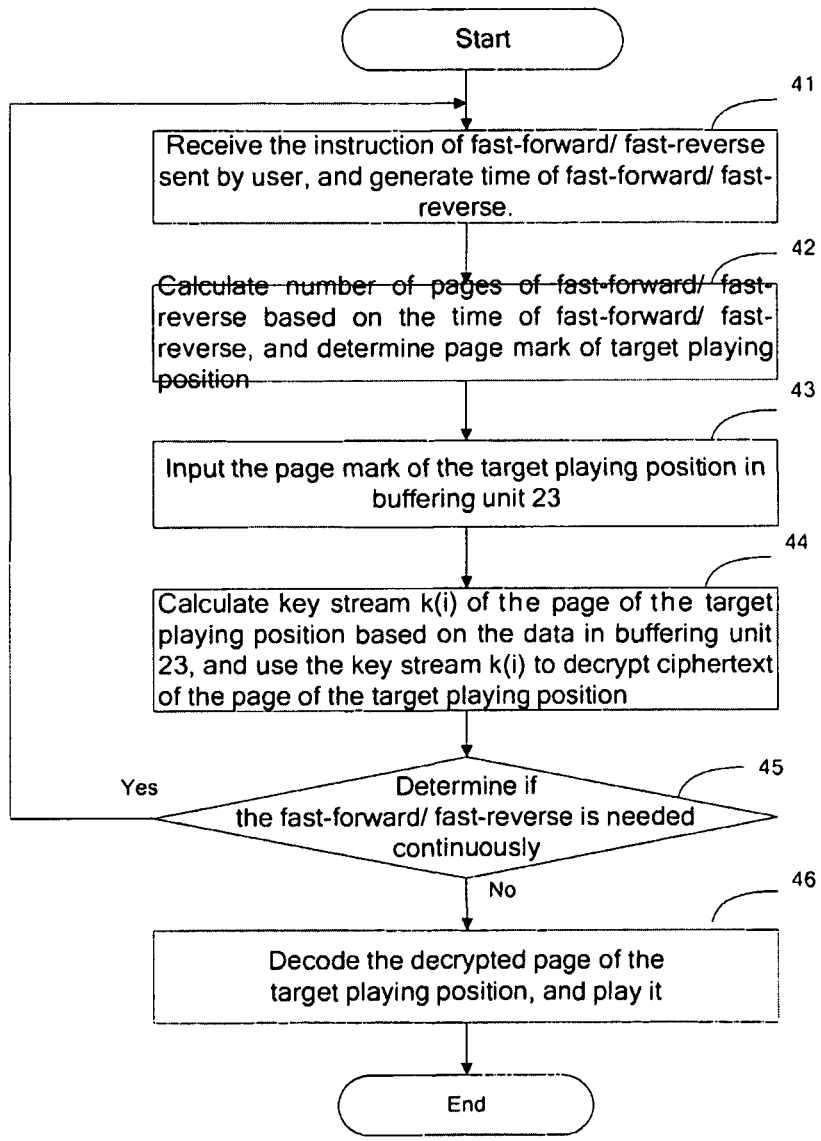
FIG. 2 is a flowchart of a playing method of a digital right managing multimedia in accordance with an embodiment of the present invention.

FIG. 2 is a flowchart of a playing method of digital right managing multimedia according to an embodiment of the present invention. As shown in FIG. 2, the process of fast-forward/fast-reverse in playing digital right managing multimedia includes the following steps:

At step 41, the controller 21 receives instruction of fast-forward/fast-reverse sent by user, and generates the time of fast-forward/fast-reverse. The instruction of fast-forward/fast-reverse sent by user is transmitted to the controller 21 through the user input interface 1, and then, the controller 21 figures out the time of fast-forward/fast-reverse on the basis of the instruction of fast-forward/fast-reverse sent by user (for instance, the time which the user spends in continuously pressing fast-forward button or fast-reverse button).

At step 42, the calculating unit 22 figures out number of Pages of fast-forward/fast-reverse (namely the number of Pages between the start playing position and target playing position) according to the time calculated at step 41, and determines the Page mark of the target playing position. The Page mark refers to the sequence number of the Page arranged in turn from the first Page. For instance, if each Page is corresponding to "a" seconds and the user needs a fast-forward of "b" seconds, b/a Pages need to be fast-forwarded; and if the Page mark of current playing position is "c", the Page mark of the target playing position is "c+(b/a)".

At step 43, the Page mark of the target playing position is input in the buffering unit 23 in which the key data of the first Page is prestored. The key data of all Pages followed the first Page can be gotten one after another through related decryption algorithm on the basis of the key data of the first Page.

At step 44, the decrypting unit 24 figures out a stochastic key stream k(i) of the target playing position based on the data in the buffering unit 23, and decrypts ciphertext of the Page of the target playing position on the basis of the stochastic key stream k(i).

At step 45, determining if the fast-forward/fast-reverse is needed continuously, if so, returning to carry out step 41 again, otherwise, carrying out step 46. Step 45 is optional, and step 46 can be carried out directly after step 44.

At step 46, the Page decrypted at step 44 is sent to the decoding device 3 for decoding, accordingly completing the process of fast-forward/fast-reverse.

The above-mentioned process is a complete operational process of fast-forward/fast-reverse. When current operation of fast-forward/fast-reverse is not completed and another operation of fast-forward/fast-reverse is triggered, the current operation of fast-forward/fast-reverse may be terminated and another operation of fast-forward/fast-reverse may be carried out so as to achieve a better playing effect. Therefore, the media player is able to directly play the Page of the new target playing position fast-forwarded/fast-reversed.

By means of the above process, in the course of fast-forward/fast-reverse, the playing method of digital right managing multimedia according to the embodiment of the present invention is able to directly calculate the stochastic key stream k(i) of the Page relevant to the target playing position according to the request of fast-forward/fast-reverse of the user without having to continuously calculate the stochastic key streams k(i) of multiple Pages between the start playing position and the target playing position in the course of fast-forward/fast-reverse, which can realize a high-efficiency operation of fast-forward/fast-reverse.

Figure 3:
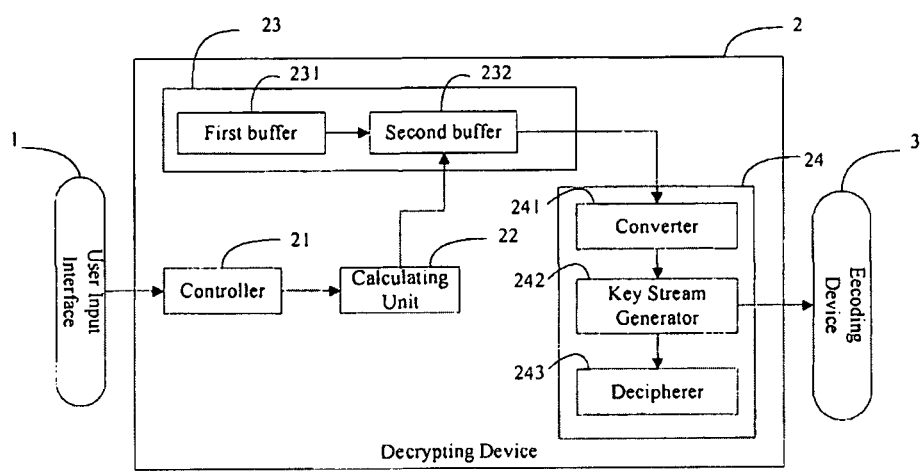
FIG. 3 is a structural schematic illustration of constituent of a playing device of digital right managing multimedia in accordance with another embodiment of the present invention.

FIG. 3 is a structural schematic illustration of the constituent of a playing device of a digital right managing multimedia according to another embodiment of the present invention. As shown in FIG. 3, the playing device includes: a user input interface 1, a decrypting device 2, and a decoding device 3. Among them, the decrypting device 2 includes: a controller 21, a calculating unit 22, a buffering unit 23 and a decrypting unit 24. The Buffering unit 23 contains a first buffer 231 and a second buffer 232. The first buffer 231 stores the key data of first Page all the time, while the second buffer 232 serves as a temporary storage. The second buffer 232 does not record data at the state of non-work. The decrypting unit 24 includes a converter 241, a key stream generator 242 and a decipherer 243. The signal connection and operational principle between all parts will be explained below in detail with reference to the work flow shown in FIG. 4.

Figure 4:
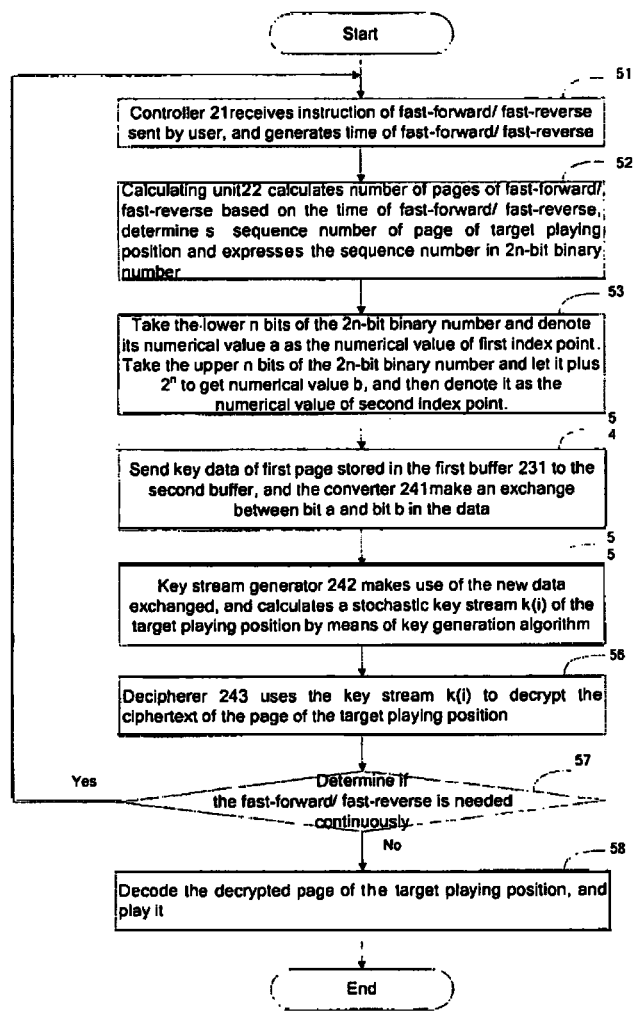
FIG. 4 is a flowchart of a playing method of a digital right managing multimedia in accordance with another embodiment of the present invention.

FIG. 4 is a flowchart of a playing method of digital right managing multimedia according to another embodiment of the present invention. As shown in FIG. 4, the process of fast-forward/fast-reverse in playing digital right managing multimedia includes the following steps:

At step 51, the controller 21 receives the instruction of fast-forward/fast-reverse sent by user, and generates the time of fast-forward/fast-reverse.

At step 52, the calculating unit 22 figures out number of Pages of fast-forward/fast-reverse based on the time of fast-forward/fast-reverse calculated at step 51, determines the Page mark of target playing position, and takes 2n-bit binary number as the Page mark, namely the sequence number of Page.

At step 53, taking the lower "n" bits of the 2n-bit binary number and denoting its numerical value "a" as the numerical value of the first index point. Taking the upper "n" bits of the 2n-bit binary number and letting it plus $2^n$ to get numerical value "b", and then denoting the numerical value "b" as the numerical value of the second index point. The numerical value "a" of the first index point and the numerical value "b" of the second index point are both input in the second buffer 232.

At step 54, the key data of the first Page stored in the first buffer 231 is input in the second buffer 232, then the converter 241 makes an exchange between bit "a" and bit "b" in the key data.

At step 55, the key stream generator 242 calculates a stochastic key stream k(i) relevant to the Page of the target playing position by means of key generation algorithm by the new data gotten by the converter 241.

At step 56, the decipherer 243 decrypts ciphertext of the Page of the target playing position on the basis of the stochastic key stream k(i) calculated at step 55.

At step 57, determining if the fast-forward/fast-reverse is needed continuously, if so, returning to carry out step 51 again, otherwise, carrying out step 58. Step 57 is optional, and step 58 can be carried out directly after step 56.

At step 58, the Page decrypted at step 56 is sent to the decoding device 3 for decoding, accordingly completing the operation of fast-forward/fast-reverse for subsequent normal playing.

The above-mentioned process is a complete operational process of fast-forward/fast-reverse. When current operation of fast-forward/fast-reverse is not completed and another operation of fast-forward/fast-reverse is triggered, the current operation of fast-forward/fast-reverse may be terminated and another operation of fast-forward/fast-reverse may be carried out so as to achieve a better playing effect.

In order to understand the flow in FIG. 4, an embodiment is given as follows. Assume the length of Page as 512 bytes and the length of key "k" as 16 bytes, and the user needs to fast-forward 20 Pages from Page 40, the Page of target playing position is Page 60. If 60 is expressed as 2n-bit binary number, it is "111100". The length of key "k" is 16 bytes, it can be divided into two of 8 bytes, 8 is equal to $2^3$, so it can be expressed in 3 bits, and "n" is equal to 3. If the sequence number of the Page of the target playing position exceeds 63 (6 bits of numerical digit are all 1 when 63 is expressed in 6-bit binary number), for instance Page 65, the value gotten by an "AND" operation between the sequence number of the Page of the target playing position and "63" serves as the sequence number of the Page of the target playing position, and the value is expressed as 2n-bit binary number. In carrying out step 53, the lower 3 bits of the 2n-bit binary number is "100", namely "4" in decimal system, so the numerical value "a" of the first index point is equal to 4. The upper 3 bits of the 2n-bit binary number is "111", namely "7" in decimal system, and 2 is equal to 8, so the numerical value "b" of the second index point is equal to 15=8+7. At step 54, making an exchange between bit 4 and bit 15 in the key data of the first Page to get new data (namely the key data of the Page of the target playing position). At step 55, the new data can be used to get the stochastic key stream k(i) of Page 60. At step 56, the ciphertext of Page 60 is decrypted on the basis of the stochastic key stream k(i). After decrypted, Page 60 is sent to the decoding device 3 for normal playing.

Steps 52, 53 and 54 in the above process are the specific decryption measures based on a specific encryption rule, and the specific encryption rule can be made clear by inverse operation of the decryption method. An example of decryption measure based on another encryption rule is given as follows.

Assume the length of Page as 512 bytes and the length of key "k" as 16 bytes (namely 128 bits), and the user needs to fast-forward 20 Pages from Page 40, the Page of target playing position is Page 60 and offset of fast-forward is 60. The key "k" of 128 bits is divided into two portions, namely 1) upper 60 bits and 2) lower (128-60) bits (namely lower 68 bits). If the offset of fast-forward exceeds 127 (whereas, 128 bits are expressed in 0 bit, 1 bit, 2 bit, ..., 127 bit), the value gotten through an "AND" operation between the offset and 127 serves as the value of offset of fast-forward. Then, making an exchange between upper 60 bits and lower 68 bits, namely that the upper 60 bits are moved to lower bits becoming lower 60 bits, while the lower 68 bits are moved to upper bits becoming upper 68 bits. Furthermore, the sequence of each bit is unchanged. In this way, the key data of the Page of the target playing position can be gotten after the exchange between the upper offset bits and the lower (128-offset) bits in the entire binary number.

The embodiments of the present invention are not limited to a certain encryption rule. The decryption method relevant to various encryption rules can be adopted when the embodiments of the present invention are applied. It is not explained here.

The embodiments of the present invention are not limited to a certain format of media data, and can be applied in playing any format of media file, such as Windows Media Audio (WMA), Windows Media Video (WMV), Windows Advanced Systems Format (ASF), RealAudio (RA), RealMedia (RM), RealMedia Variable Bitrate (RMVB), MP3, OGG, Lossless Audio (APE), Lossless Audio Codec (FLAC), and Windows Audio Waveform (WAV) etc. The present invention is not limited in these formats. The embodiments of the present invention are suitable for playing the media files encrypted by all kinds of methods, which include all-encrypted media files and partially-encrypted media files. After the embodiments of the present invention are adopted, the media player is able to quickly calculate the key steam relevant to the media data of the target playing position according to the target playing position of fast-forward/fast-reverse without having to continuously calculate multiple key streams, which can quickly decrypt the media data to get the original content and provide the user with high-quality digital right managing multimedia content the same as the fast-forward/fast-reverse of ordinary multimedia content.

The above-mentioned description are only the embodiments of the present invention, but it should not be construed as limiting the overall scope of the present invention as far as its broader states is concerned. For example, the length of both key "k" and each Page is able to vary with practical situation, but the operational method of fast-forward/fast-reverse can be used indiscriminately. Further, in the light of different encryption methods, related decryption methods can be adopted to make use of the fast-forward/fast-reverse method as described in the present invention. On the whole, the equivalent transformation similar to the above-mentioned shall be included in the scope limited by claims.

What is claimed is:

1. A playing method of digital right managing (DRM) multimedia in which files of DRM multimedia to be played take a page as a basic playing unit, when operation of fast-forward/fast-reverse is triggered, the playing method comprising:
   determining a time duration of fast-forward/fast-reverse from a first page to a target page;
   determining a number of pages of fast-forward/fast-reverse based on the time duration of fast-forward/fast-reverse;
   determining a position of the target page based on the number of pages of fast-forward/fast-reverse;
   calculating a key stream of the position of the target page based on prestored key data of the first page without calculating a key of a page between the first page and the target page;
   decrypting ciphertext of the target page based on the calculated key stream of the position of the target page; and
   decoding the decrypted target page, and starting to play from the decrypted target page,
   wherein determining a number of pages of fast-forward/fast-reverse based on the time duration of fast-forward/fast-reverse includes determining a number n of pages of fast-forward/fast-reverse based on the time duration of fast-forward/fast-reverse by dividing the time duration of fast-forward/fast-reverse of n pages by a time duration of fast-forward/fast-reverse of a single page, and
   wherein calculating a key stream of the position of the target page includes calculating the key stream of the position of the target page according to the prestored key data of the first page and the position of the target page.

2. The method according to claim 1, wherein further including:
when current operation of fast-forward/fast-reverse is not completed, and another operation of fast-forward/fast-reverse is triggered, the current operation of fast-forward/fast-reverse is terminated.

3. The method according to claim 1, wherein the fast-forward/fast-reverse is operated continuously.

4. The method according to claim 1, wherein the step of determining a time duration of fast-forward/fast-reverse includes: determining the time duration of fast-forward/fast-reverse according to instructions of fast-forward/fast-reverse input by a user.

5. The method according to claim 1, wherein the step of calculating a key stream of the position of the target page based on a prestored key data of the first page includes:
calculating the key data-of the target page based on the prestored key data of the first page;
calculating the key stream of the position of the target page based on the key data of the target page.

6. The method according to claim 1, wherein the files of DRM multimedia are all-encrypted files or partially-encrypted files.

7. The method according to claim 1, wherein media formats of the files of DRM multimedia include Windows Media Audio, Windows Media Video, Windows Advanced Systems Format, RealMedia, RealAudio, RealMedia Variable Bitrate, MP3, OGG, Lossless Audio APE, Lossless Audio Codec, or Windows Audio Waveform.

8. A playing device of digital right managing multimedia, comprising:
a decrypting device that determines a time duration of fast-forward/fast-reverse from a first page to a target page, determines a number of pages of fast-forward/fast-reverse based on the time duration of fast-forward/fast-reverse, determines a position of the target page based on the number of pages of fast-forward/fast-reverse, calculates a key stream of the position of the target page based on prestored key data of the first page without calculating a key of a page between the first page and the target page, and decrypts ciphertext of the target page based on the calculated key stream of the position of the target page; and
a decoding device that decodes the target page decrypted by the decrypting device and starts to play the decrypted target page,
wherein the decrypting device includes a decryption unit that calculates the key stream of the position of the target page according to the key data of the first page and the position of the target page, and decrypts the ciphertext of the target page based on the key stream of the position of the target page, and
wherein a number n of pages of fast-forward/fast-reverse is determined by dividing a time duration of fast-forward/fast-reverse of n pages by a time duration of fast-forward/fast-reverse of a single page.

9. The device according to claim 8, wherein the decrypting device includes:
a controller that receives instructions of fast-forward/fast-reverse;
a calculating unit that determines the time duration of fast-forward/fast-reverse based on the instructions of fast-forward/fast-reverse from the controller, determines the number of pages of fast-forward/fast-reverse according to the time duration of fast-forward/fast-reverse, and determines the position of the target page according to the number of pages of fast-forward/fast-reverse; and
a buffering unit that prestores the key data of the first page and stores the position of the target page calculated by the calculating unit.

10. The device according to claim 9, wherein the buffering unit includes:
a first buffer that stores the key data of the first page; and
a second buffer that stores the position of the target page calculated by the calculating unit, receives the key data of the first page from the first buffer, and sends the key data of the first page and the position of the target page to the decrypting unit.

11. The device according to claim 9, wherein the decrypting unit includes:
a converter that receives the key data of the first page and the position of the target page from the buffering unit, converts the key data of the first page according to the position of the target page and gets the key data of the target page;
a key stream generator that calculates the key stream of the position of the target page according to the key data of the target page obtained by the converter; and
a decipherer that decrypts the ciphertext of the target page according to the key stream of the position of the target page calculated by the key stream generator.

12. The device according to claim 8, wherein the playing device further includes a user input interface that receives instructions of fast-forward/fast-reverse from a user, and transmits the instructions to the decrypting device.

13. A playing method for digital right managing (DRM) multimedia for a fast-forward/fast-reverse process from a first page to a target page, the playing method comprising:
taking a page as a playing basic unit,
pre-storing key data of the first page,
determining a time duration of fast-forward/fast-reverse;
determining a number of pages of fast-forward/fast-reverse based on the time duration of fast-forward/fast-reverse;
determining a position of the target page based on the number of pages of fast-forward/fast-reverse;
calculating a key stream of the position of the target page based on the pre-stored key data of the first page without calculating a key of a page between the first page and the target page;
decrypting ciphertext of the target page based on the calculated key stream of the position of the target page; and
decoding the decrypted target page, and start to play from the decrypted target page,
wherein determining a number of pages of fast-forward/fast-reverse based on the time duration of fast-forward/fast-reverse includes determining a number n of pages of fast-forward/fast-reverse based on the time duration of fast-forward/fast-reverse by dividing the time duration of fast-forward/fast-reverse of n pages by a time duration of fast-forward/fast-reverse of a single page, and
wherein calculating a key stream of the position of the target page includes calculating the key stream of the position of the target page according to the prestored key data of the first page and the position of the target page.

* * * * *